UNITED STATES PATENT OFFICE.

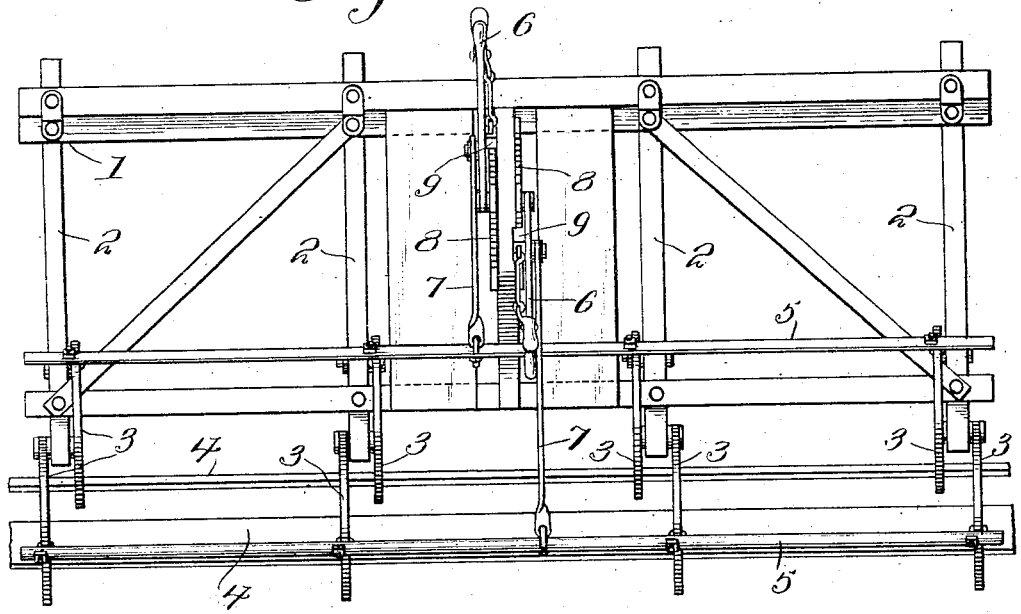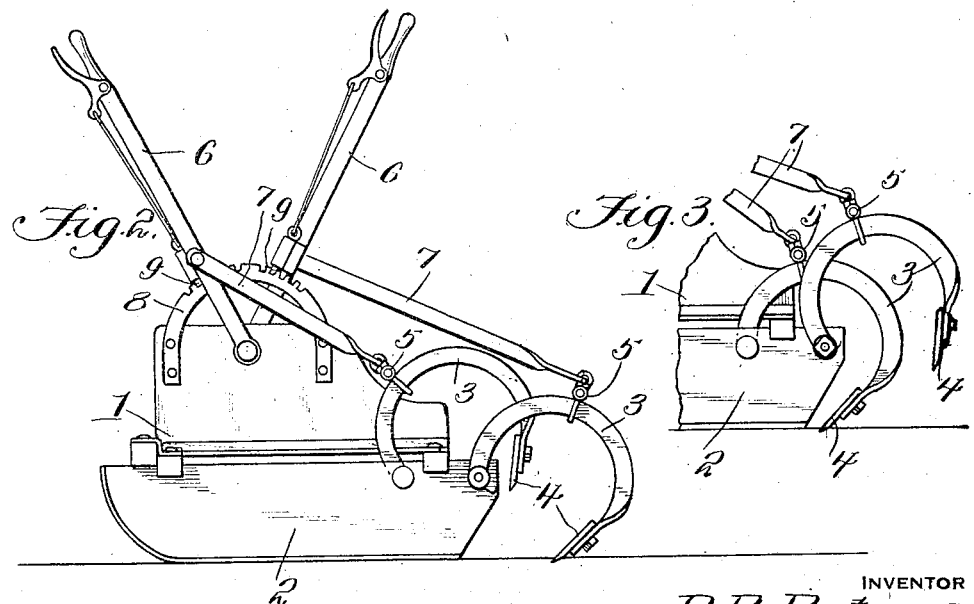

PLINY B. BATEMAN, OF WALLA WALLA, WASHINGTON.

WEEDER.

1,251,324.

Specification of Letters Patent. Patented Dec. 25, 1917.

Application filed April 13, 1917. Serial No. 161,817.

*To all whom it may concern:*

Be it known that I, PLINY B. BATEMAN, a citizen of the United States, residing at Walla Walla, in the county of Walla Walla and State of Washington, have invented new and useful Improvements in Weeders, of which the following is a specification.

This invention relates to weeders of the scraper type and it consists in the novel features hereinafter described and claimed.

An object of the invention is to provide a weeder of the character stated which is of simple and durable structure and which includes in combination with other means and elements a plurality of blades positioned at a right angle to the line of draft of the weeder and means for elevating the said blades successively or alternately whereby one blade is in operation at the surface of the soil while the other blade is elevated and freeing itself from weeds or trash which may have accumulated thereon.

In the accompanying drawing:—

Figure 1 is a top plan view of the weeder;

Fig. 2 is an end view of the same;

Fig. 3 is a fragmentary end view of the same showing the parts in a different position from that illustrated in Fig. 2.

The weeder includes a sled 1 of usual pattern and which is provided with runners 2 in a usual manner. Any suitable means may be provided for dragging the sled over the surface of the ground. Curved arms 3 are pivoted to the rear portions of the runners 2. Some of these arms are located in advance of the other arms and those which are in advance are pivoted at one side of the runners 2 while the rear arms are pivoted at the opposite sides thereof. The said arms are curved longitudinally, the said curvature being preferably in the form of arcs.

Blades 4 are carried at the rear ends of the forward and rear sets of arms and braces 5 are applied to the upper portions of the said arms. Levers 6 are pivoted upon the body of the sled 1 and are connected with the said braces by means of rods 7. Securing segments 8 are also mounted upon the body of the sled and may be engaged by pawls 9 carried by the levers whereby the said levers are held at adjusted positions with relation to the body of the sled.

In operation, the sled is drawn over the surface of the ground and one lever 8 is swung whereby the arms and the blades connected with the same are lowered. At this time the other lever is in a position whereby the arms and blades connected with the same are held at an elevated position. As the sled moves over the surface of the ground, the lowered blade encounters the weeds and cuts the same. When the said lowered blade has accumulated weeds or trash to such an extent as to interfere with its proper operation the other blade is lowered and the said blade which has been in contact with the ground is raised thereby freeing itself from the accumulated trash while the other blade is in operation at the surface of the soil.

By this arrangement it will be seen that a structure is provided wherein the blades are disposed at a right angle to the line of draft of the implement and the said blade may be manipulated to effectually remove the weeds from the entire surface of the soil and also to free themselves at desired intervals.

Having described the invention what is claimed is:—

A weeder comprising a support, two sets of curved arms pivoted to the support, one set being located in advance of the other, blades carried by the sets of arms, attached to all of the arms of the same set, braces connected with the arms of the same set and levers mounted upon the support and operatively connected with the braces.

In testimony whereof I affix my signature.

PLINY B. BATEMAN.

Copies of this patent may be obtained for five cents each, by addressing the "Commissioner of Patents, Washington, D. C."